United States Patent
Rohrmann et al.

(10) Patent No.: US 11,674,502 B2
(45) Date of Patent: Jun. 13, 2023

(54) BEARING ASSEMBLY OF A ROTOR OF A WIND TURBINE

(71) Applicant: Renk Aktiengesellschaft, Augsburg (DE)

(72) Inventors: Thorsten Rohrmann, Binder (DE); Peter Decker, Hannover (DE); Lutz Winter, Laatzen (DE); Janina Brencher, Hannover (DE)

(73) Assignee: RENK GMBH, Augsburg (DE)

( * ) Notice: Subject to any disclaimer, the term of this patent is extended or adjusted under 35 U.S.C. 154(b) by 50 days.

(21) Appl. No.: 17/272,082

(22) PCT Filed: Aug. 1, 2019

(86) PCT No.: PCT/EP2019/070771
§ 371 (c)(1),
(2) Date: Feb. 26, 2021

(87) PCT Pub. No.: WO2020/043421
PCT Pub. Date: Mar. 5, 2020

(65) Prior Publication Data
US 2021/0348599 A1    Nov. 11, 2021

(30) Foreign Application Priority Data
Aug. 27, 2018  (DE) ..................... 10 2018 120 806.5

(51) Int. Cl.
*F03D 80/70*   (2016.01)
*F16C 17/10*   (2006.01)
(Continued)

(52) U.S. Cl.
CPC ............ *F03D 80/70* (2016.05); *F16C 17/065* (2013.01); *F16C 17/107* (2013.01);
(Continued)

(58) Field of Classification Search
CPC ...... F16C 17/065; F16C 17/107; F16C 17/26; F16C 33/108; F16C 33/26; F16C 43/02;
(Continued)

(56) References Cited

U.S. PATENT DOCUMENTS

2013/0287574 A1* 10/2013 Ebbesen ................. F03D 80/70
                                                    416/170 R
2014/0169952 A1*  6/2014 Pedersen ................. F03D 15/20
                                                    415/170.1
(Continued)

FOREIGN PATENT DOCUMENTS

EP      3 219 984       9/2017
WO   WO 2011/127510   10/2011

OTHER PUBLICATIONS

International Search Report issued in corresponding PCT Application PCT/EP2019/070771.

*Primary Examiner* — Alan B Waits
(74) *Attorney, Agent, or Firm* — Cozen O'Connor

(57) ABSTRACT

A bearing assembly of a rotor of a wind turbine, namely for mounting the rotor in a fixed housing, includes: a plurality of rotor-side axial slide bearing segments, each configured to: engage on the rotor, rotate together with the rotor, and be supported against a sliding surface of the housing; a plurality of housing-side axial slide bearing segments, each configured to: engage on the housing, be fixed together with the housing, and be supported against a first sliding surface of the rotor; and a plurality of housing-side radial slide bearing segments, each configured to: engage on the housing, be fixed together with the housing and be supported against a second sliding surface of the rotor.

13 Claims, 6 Drawing Sheets

(51) Int. Cl.
 *F16C 33/26* (2006.01)
 *F16C 17/06* (2006.01)
 *F16C 43/02* (2006.01)
 *F16C 33/10* (2006.01)

(52) U.S. Cl.
 CPC ............ *F16C 33/108* (2013.01); *F16C 33/26* (2013.01); *F16C 43/02* (2013.01); *F16C 2300/14* (2013.01); *F16C 2360/31* (2013.01)

(58) Field of Classification Search
 CPC .............. F16C 2237/00; F16C 2300/14; F16C 2360/31; F03D 80/70
 See application file for complete search history.

(56) References Cited

U.S. PATENT DOCUMENTS

| | | | |
|---|---|---|---|
| 2014/0193262 A1* | 7/2014 | Pedersen | F03D 80/50 416/174 |
| 2015/0017000 A1* | 1/2015 | Sato | F16C 17/10 416/174 |
| 2017/0260970 A1* | 9/2017 | Stiesdal | F03D 80/50 |
| 2019/0113026 A1* | 4/2019 | Sørensen | F16C 17/107 |
| 2019/0170115 A1* | 6/2019 | Mtauweg | F03D 80/70 |

* cited by examiner

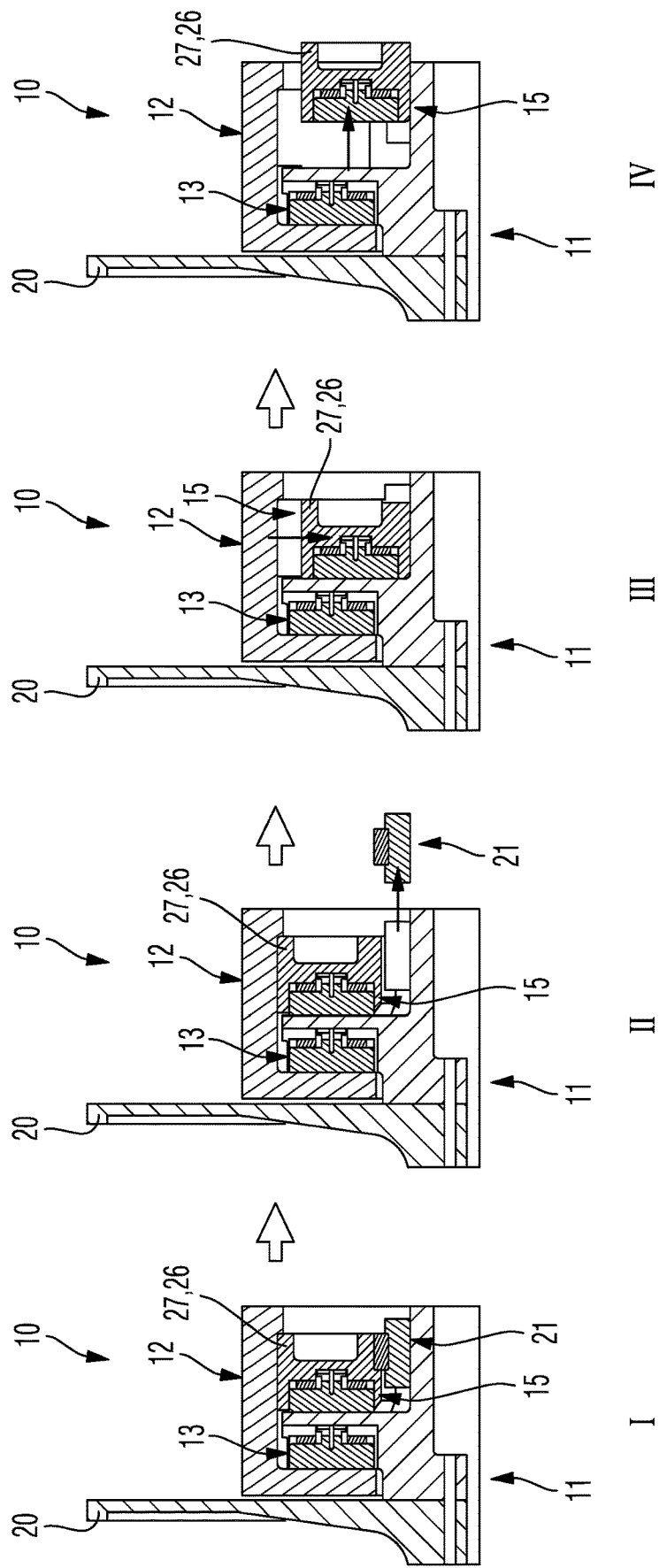

BEARING ASSEMBLY OF A ROTOR OF A WIND TURBINE

CROSS REFERENCE TO RELATED APPLICATIONS

This is a U.S. national stage of International application No. PCT/EP2019/070771, filed on Aug. 1, 2019, which claims priority to German Application No. 10 2018 120 806.5, filed Aug. 27, 2018, the content of each of which is incorporated herein by reference.

BACKGROUND OF THE INVENTION

1. Field of the Invention

The invention relates to a bearing assembly of a rotor of a wind turbine.

2. Description of the Prior Art

For mounting a rotor of a wind turbine, which is coupled to rotor blades of the wind turbine and driven by the rotor blades of the wind turbine, exclusively rolling bearings have been employed in practice up to now. In the event of a failure of the rolling bearing, the entire drive train has to be disassembled. In most cases, this requires a complete disassembly of the wind turbine.

From WO 2011/127510 a bearing assembly of a rotor of a wind turbine which utilizes slide bearings is known. The bearing assembly comprises at least two slide bearings arranged at an axial distance from one another, which are composed of slide bearing pads, wherein the slide bearings are arranged in planes that are angularly positioned relative to one another. The slide bearing pads of the slide bearings, which provide slide bearing segments, are positioned on a tilted raceway, as a result of which a spherical shape of the respective sliding surface is required. Such a spherical shape of the respective slide bearing surface can only be produced with major expenditure. Moreover, no validated hydrodynamic simulation tool is known to date with which such a bearing assembly could be designed.

There is a need for a bearing assembly of a rotor of a wind turbine which on the one hand can be easily produced and on the other hand, in the event of a failure, does not require the complete disassembly of the wind turbine.

SUMMARY OF THE INVENTION

Starting out from this, it is an object of the present invention to create a new type of bearing assembly of a rotor of a wind turbine.

This object may be solved through a bearing assembly according for mounting the rotor of the wind turbine in a fixed housing of the wind turbine comprising at least the following assemblies: firstly, rotor-side axial slide bearing segments which engage on the rotor, rotate together with the rotor and are supported against a sliding surface of the housing. Secondly, housing-side axial slide bearing segments which engage on the housing, are fixed together with the housing and are supported against a first sliding surface of the rotor. Thirdly, housing-side radial slide bearing segments which engage on the housing, are fixed together with the housing and are supported against a second sliding surface of the rotor. The axial slide bearing segments comprise rotor-side axial slide bearing segments and housing-side axial slide bearing segments. The axial slide bearing segments are supported on axial sliding surfaces, namely the rotor-side axial slide bearing segments on an axial surface of the housing and the housing-side axial slide bearing segments on an axial surface of the rotor. The housing-side radial slide bearing segments are supported on a radial surface or circumferential surface of the rotor. In the event of a failure of the bearing assembly, the individual slide bearing segments can be individually accessed as a result of which it is not necessary to disassemble the entire drive train or the entire wind turbine. A spherical shape of sliding surfaces is not required. The bearing assembly can be easily produced.

According to an advantageous further development of the invention, the bearing assembly comprises a radial projection of the rotor forming a rotor-side thrust collar, which is securely connected to a hub or shaft of the rotor, wherein the rotor-side axial slide bearing segments are fastened to this radial projection. The housing-side axial slide bearing segments are supported against the rotor-side thrust collar. The housing-side radial slide bearing segments are supported against the hub or shaft of the rotor. This allows a simple production of the bearing assembly. In the event of a failure, individual slide bearing segments can be individually accessed.

According to an advantageous further development of the invention, the bearing assembly comprises a housing-side segment holder, which receives both the housing-side axial slide bearing segments and also the housing-side radial slide bearing segments, wherein the segment holder is detachably fastened to the housing. Preferentially, the segment holder is segmented, wherein each segment of the segment holder receives at least one housing-side axial slide bearing segment and at least one housing-side radial slide bearing segment.

The segment holder serves for the simple receiving of the housing-slide bearing segments. In particular when the segment holder is also segmented, individual slide bearing segments can be particularly advantageously accessed in the event of a failure, namely the housing-side slide bearing segments fastened to the respective segment of the segment holder.

According to an advantageous further development of the invention for removing a housing-side axial slide bearing segment, the specific housing-side radial slide bearing segment, which together with the housing-side axial slide bearing segment to be removed is mounted on the same segment of the segment holder, is initially demountable from the respective segment of the segment holder, wherein following this the respective segment of the segment holder is demountable from the housing and removable together with the housing-side axial slide bearing segment to be removed. This allows a simple and advantageous access to the housing-side slide bearing segments.

Preferentially, a threading opening for the rotor-side axial slide bearing segments is formed on the housing, via which the rotor-side axial slide bearing segments can be mounted and demounted. The threading opening allows a simple and individual access to the individual rotor-side axial slide bearing segments.

BRIEF DESCRIPTION OF THE DRAWINGS

Preferred further developments of the invention are obtained from the following description. Exemplary embodiments of the invention are explained in more detail by way of the drawings without being restricted to this. In the drawings:

FIG. 5 shows multiple cross sections through the bearing assembly analogous to FIG. 2 for illustrating the access to individual segments of the bearing assembly.

DETAILED DESCRIPTION OF THE PRESENTLY PREFERRED EMBODIMENTS

The invention relates to a bearing assembly of a wind turbine that is coupled to rotor blades. Such a rotor of the wind turbine is also referred to as main rotor of the wind turbine.

Figure 1:
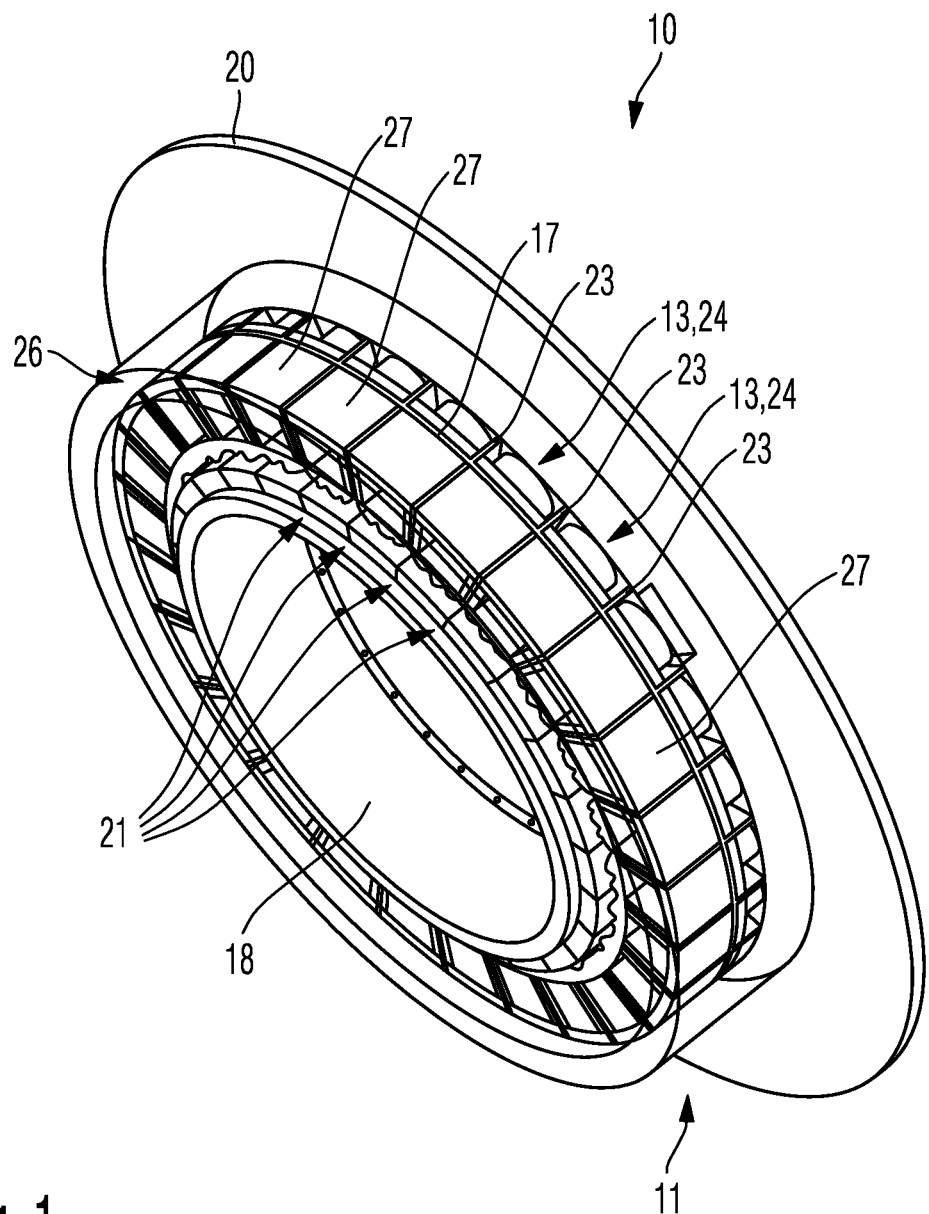
FIG. 1 is a perspective view of a bearing assembly of a rotor of a wind turbine according to an aspect of the invention.
Figure 2:
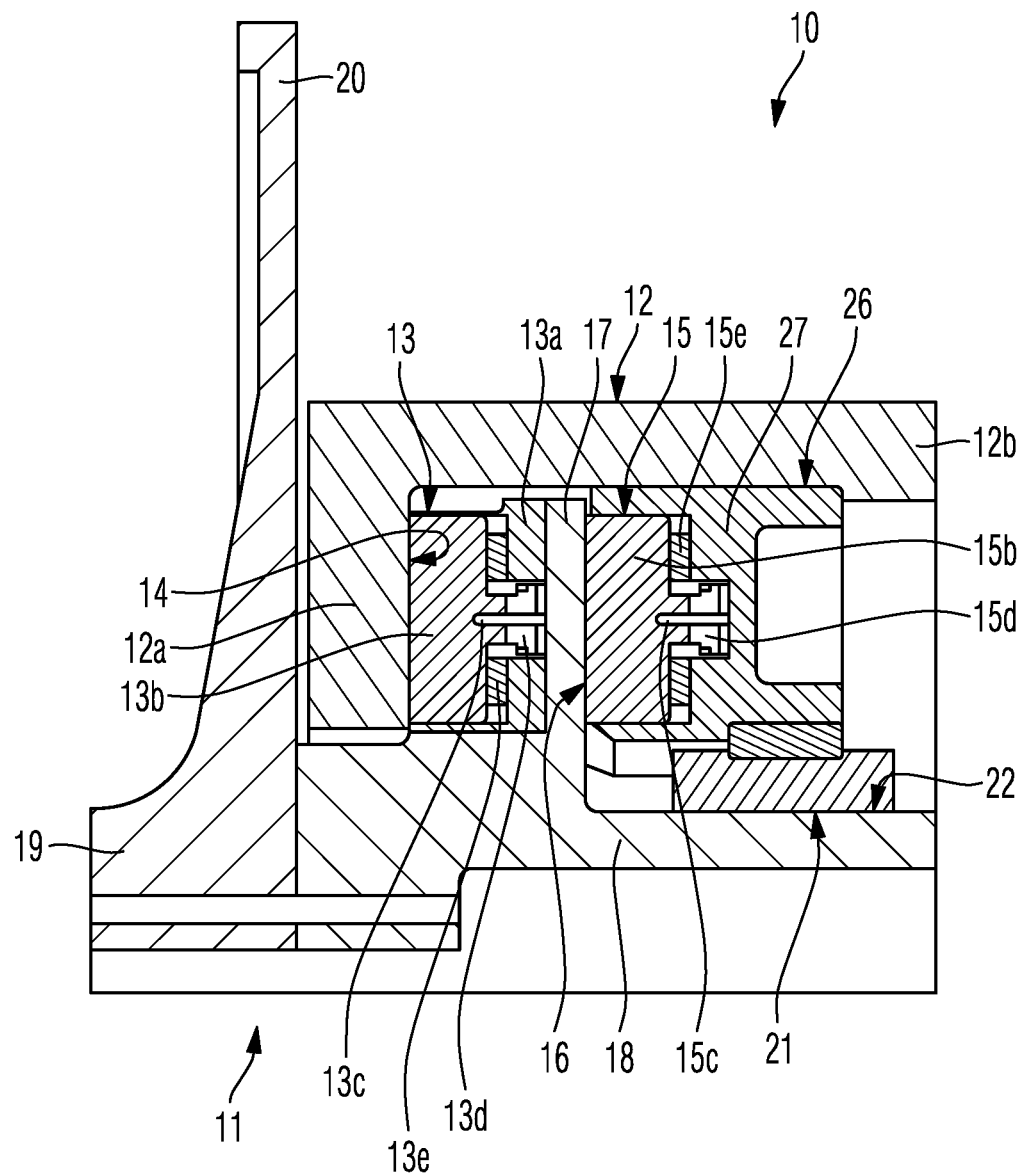
FIG. 2 is a first cross section through the bearing assembly of FIG. 1.
Figure 3:
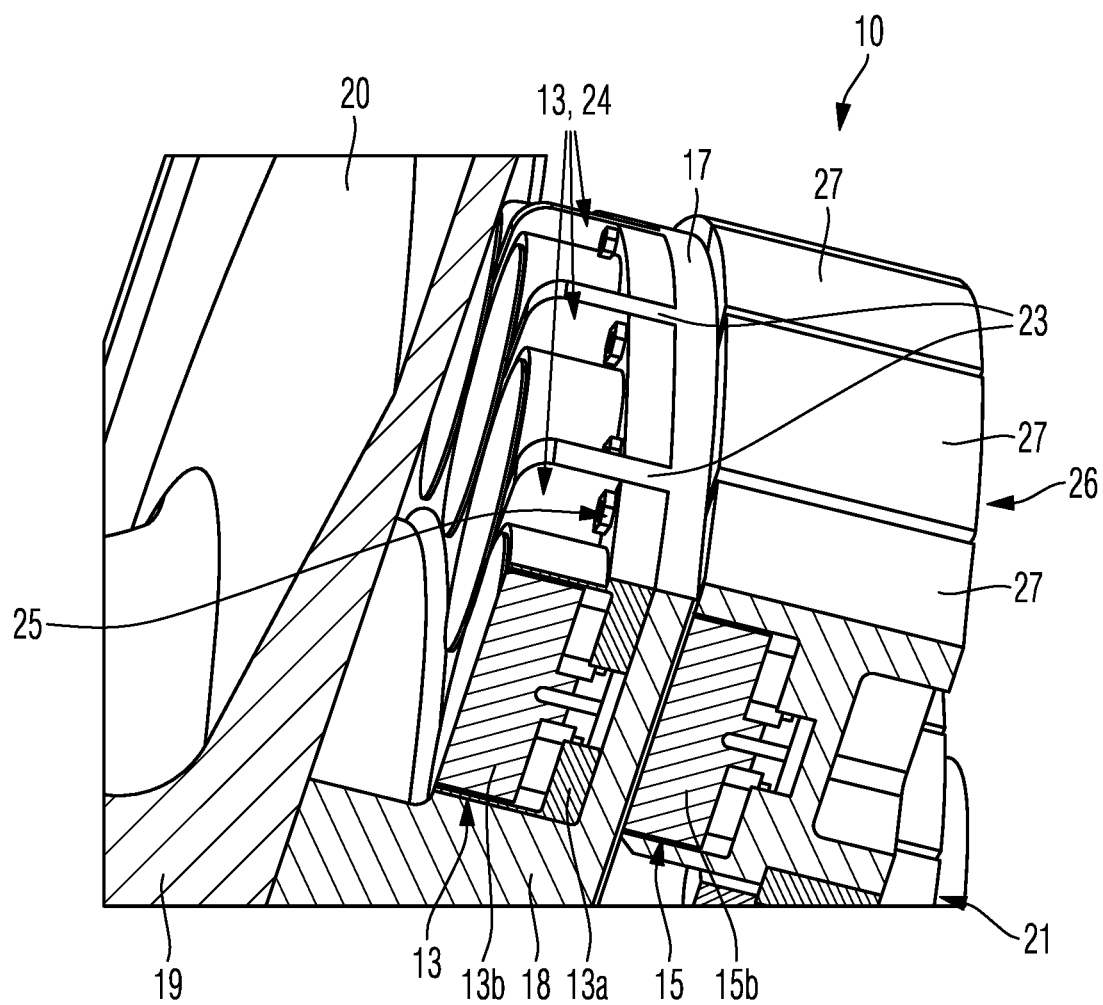
FIG. 3 is a second cross section through the bearing assembly of FIG. 1.

FIG. 1 shows a perspective view of a bearing assembly of a rotor of a wind turbine according to an aspect of the invention. FIGS. 2 and 3 show, by way of extracts, cross sections through the bearing assembly 10, namely FIG. 3 a perspective cross section by way of an extract.

The bearing assembly 10 of FIGS. 1, 2 and 3, which serves for the mounting of the rotor 11 of the wind turbine in the fixed housing 12 of the same comprises multiple slide bearing segments.

Accordingly, the bearing assembly 10 comprises rotor-side axial slide bearing segments 13.

The rotor-side axial slide bearing segments 13 engage on the rotor 11 or are fastened to the rotor 11, rotate together with the rotor 11 and are supported against the housing 12, namely against an axial sliding surface 14 of the housing 12, which is formed on a housing section 12a of the housing 12 extending in the radial direction.

In addition to these rotor-side axial slide bearing segments 13, the bearing assembly 10 comprises housing-side axial slide bearing segments 15.

The housing-side axial slide bearing segments 15 engage on the housing 12 or are fastened to the housing 12, namely on a housing section 12b extending in the axial direction. These housing-side axial slide bearing segments 15 are supported on the rotor 11, namely against an axial sliding surface 16 of the rotor 11, which is formed by a radial projection 17 of the rotor 11, wherein the projection 17 is an integral part of a shaft 18 of the rotor 11. Originating from the shaft 18, the radial projection 17 extends to radially outside and in the circumferential direction round about the shaft 18. A hub 19 of the rotor 11, on which the rotor blades 20 engage, engages on the shaft 18.

In addition to the rotor-side axial slide bearing segments 13 and the housing-side axial slide bearing segments 15 the bearing assembly 10 comprises housing-side radial slide bearing segments 21.

These housing-side radial slide bearing segments 21 in turn engage on the housing 12 or are connected to the housing 12, wherein the housing-side radial slide bearing segments 21 in turn are supported on the rotor 11, namely on a circumferential sliding surface 22 of the rotor 11, which is defined by the shaft 18 of the rotor 11.

Accordingly, the bearing assembly 10 according to an aspect of the invention comprises at least the rotor-side axial slide bearing segments 13, the housing-side axial slide bearing segments 15 and the housing-side radial slide bearing segments 21, wherein the axial slide bearing segments 13, 15 are supported on axial sliding surfaces 14, 16, which run perpendicularly to the radial direction of the rotor 11, whereas the radial slide bearing segments 21 are supported on a circumferential sliding surface 21 of the rotor 11. A spherical shape of the sliding surfaces is not provided in the bearing assembly according to the invention.

The radial projection 17 of the shaft 18 of the rotor 11, on which the housing-side axial slide bearing segments 15 are supported, forms a rotor-side thrust collar. On this rotor-side thrust collar 17 or the radial projection 17, axial projections 23 (see in particular FIG. 3) are formed, which define receiving pockets 24 for the rotor-side axial slide bearing segments 13. Multiple such receiving pockets 24 are formed over the circumference wherein in each of these receiving pockets 24 a rotor-side axial slide bearing segment 13 is arranged.

The rotor-side axial slide bearing segments 13 are connected to the rotor 11, namely with the projection or the thrust collar 17, namely according to FIG. 3 by way of suitable fastening screws 25.

Located opposite the side of the thrust collar 17, on which the rotor-side axial slide bearing segments 13 are connected to the thrust collar 17 of the rotor 11, the thrust collar 17 forms the axial sliding surface 16, on which the housing-side axial slide bearing segments 15 are supported.

The rotor-side axial slide bearing segments 13 comprise a holder 13a, in which the actual sliding body 13b is received.

The respective sliding body 13b is mounted in the holder 13a via a screw 13c, which extends through a cover 13d of the holder 13a into the sliding body 13b. Between the slide bearing 13b and the holder 13a a disc spring 13e is arranged here.

A housing-side segment holder 26 serves for mounting or fastening the housing-side slide bearing segments 15 and 21, namely the housing-side axial slide bearing segments 15 and the housing-side radial slide bearing segments 21 on the housing section 12b of the housing 12. This housing-side segment holder 26 is preferentially segmented and comprises multiple segments 27.

Each segment 27 of the segment holder 26 is connected to the housing 12 or fastened to the housing 12 by way of fasteners which are not shown. On each segment 27 of the housing-side segment holder 26 at least one housing-side axial slide bearing segment 15 and at least one housing-side radial slide bearing segment 21 are detachably fastened. This detachable fastening of the housing-side slide bearing segments 15, 21 on the respective segment 27 of the segment holder 26 in turn is effected by way of fastening devices which are not shown.

In the illustrated preferred exemplary embodiment, a single housing-side axial slide bearing segment 15 and a single housing-side radial slide bearing segment 21 are fastened to the respective segment 27 of the segment holder 26. In contrast with this it is also possible that on each segment 27 of the segment holder 26 multiple housing-side axial slide bearing segments 15 and multiple housing-side radial slide bearing segments 21 each are fastened, wherein then the number of the housing-side axial slide bearing segments 15 received on the respective segment 27 of the segment holder 26 preferentially corresponds to the number of the radial slide bearing segments received on the respective segment 27 of the segment holder 26.

Furthermore it is possible in contrast with this that the number of the housing-side axial slide bearing segments 15 received on the respective segment 27 of the segment holder 26 deviates from the number of the housing-side radial slide bearing segments received on the respective segment 27 of the segment holder 26, wherein it can be provided in a first version that on the respective segment 27 in particular two housing-side axial slide bearing segments 15 and a single housing-side radial slide bearing segment 21 or according to a second version a single housing-side axial slide bearing segment 15 and two housing-side radial slide bearing segments 21 are received.

Each of the housing-side axial slide bearing segments 15 comprises, just like each of the rotor-side axial slide bearing segments 13, a sliding body 15b, which is received in the respective segment 27 of the segment holder 26. Fastening of this sliding body 15b in the respective segment 27 is effected by way of a screw 15c penetrating a cover 15d, wherein between the sliding body 15b and the segment 27 of the segment holder 26 a disc spring 15e is positioned.

Figure 4A:
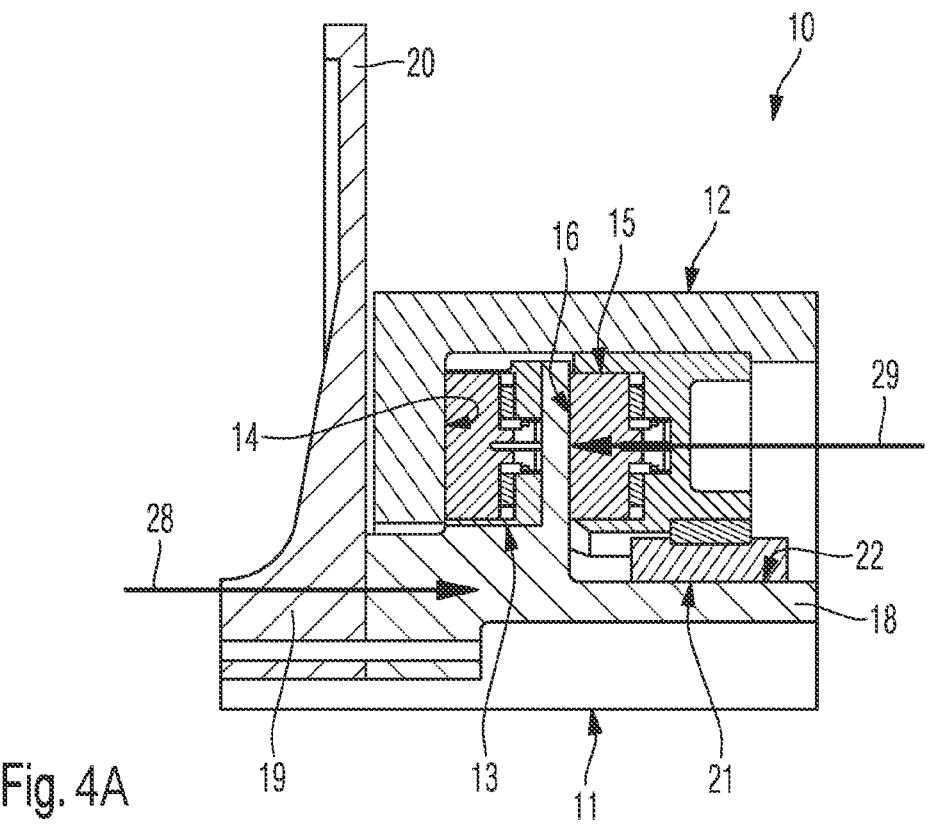
FIG. 4A is the cross section of FIG. 2 with first force arrows.
Figure 4B:
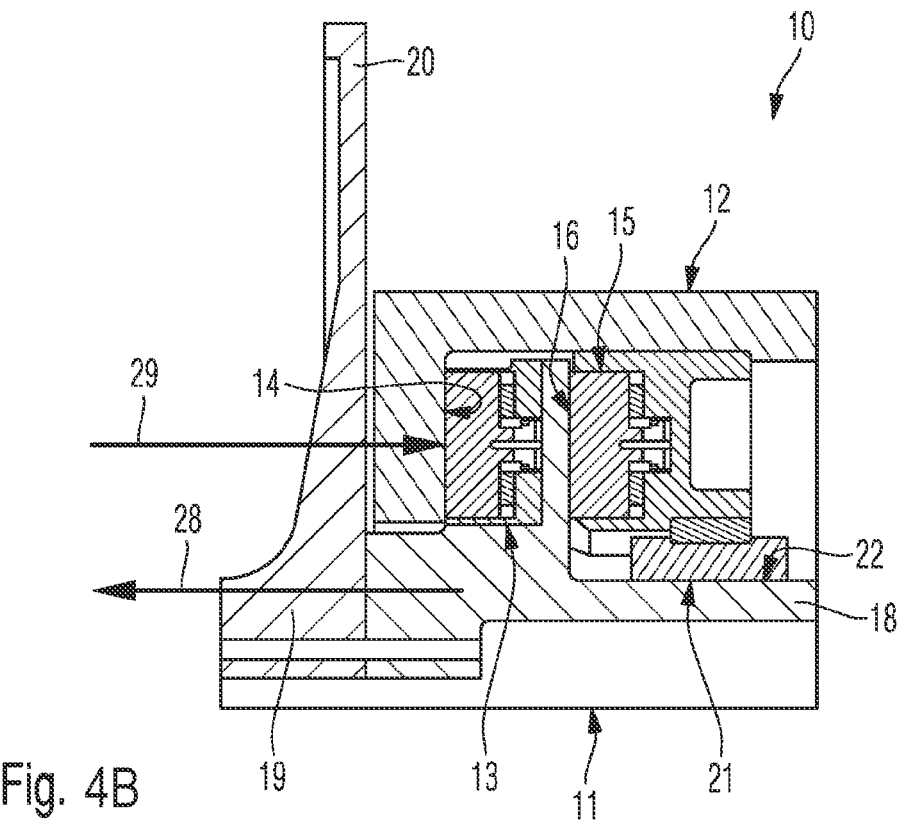
FIG. 4B is the cross section of FIG. 2 with second force arrows.

FIGS. 4A and 4B show the extract of FIG. 2 with force arrows, wherein force arrows 28 each illustrate a bearing load and force arrows 29 each a reaction force.

In FIG. 4A, the bearing load 28 acts in a first axial direction, wherein the reaction force then acts via the housing-side axial slide bearing segments 15 onto the axial sliding surface 16 of the rotor 11. In FIG. 4B, the bearing load 28 acts in an opposite axial direction, while the reaction force acts via the rotor-side axial slide bearing segments 13 onto the axial sliding surface 14 of the housing 12.

FIG. 5 illustrates details relating to the access to the housing-side slide bearing segments 15, 21. In particular when one of the housing-side axial slide bearing segments 15 is to be removed from the bearing assembly 10, initially, for removing such a housing-side axial slide bearing segment 15, the specific housing-side radial slide bearing segment 21 is demountable from the segment 27 of the segment holder 26, which together with the housing-side axial slide bearing segment 15 to be removed is mounted on the respective segment 27 of the segment holder 26. This is shown in FIG. 5 in the state II. Following the disassembly of the respective housing-side radial slide bearing segment 15 from the respective segment 27 of the segment holder 26, the respective segment 27 of the segment holder 26 is demountable from the housing 12 and can be removed from the bearing assembly together with the housing-side axial slide bearing segment 15 to be removed. This is shown by the states III and IV of FIG. 5.

In the above manner, individual housing-side radial slide bearing segments 21 and individual housing-side axial slide bearing segment 15 can be individually accessed in the event of a failure of the bearing assembly 10.

Figure 6:
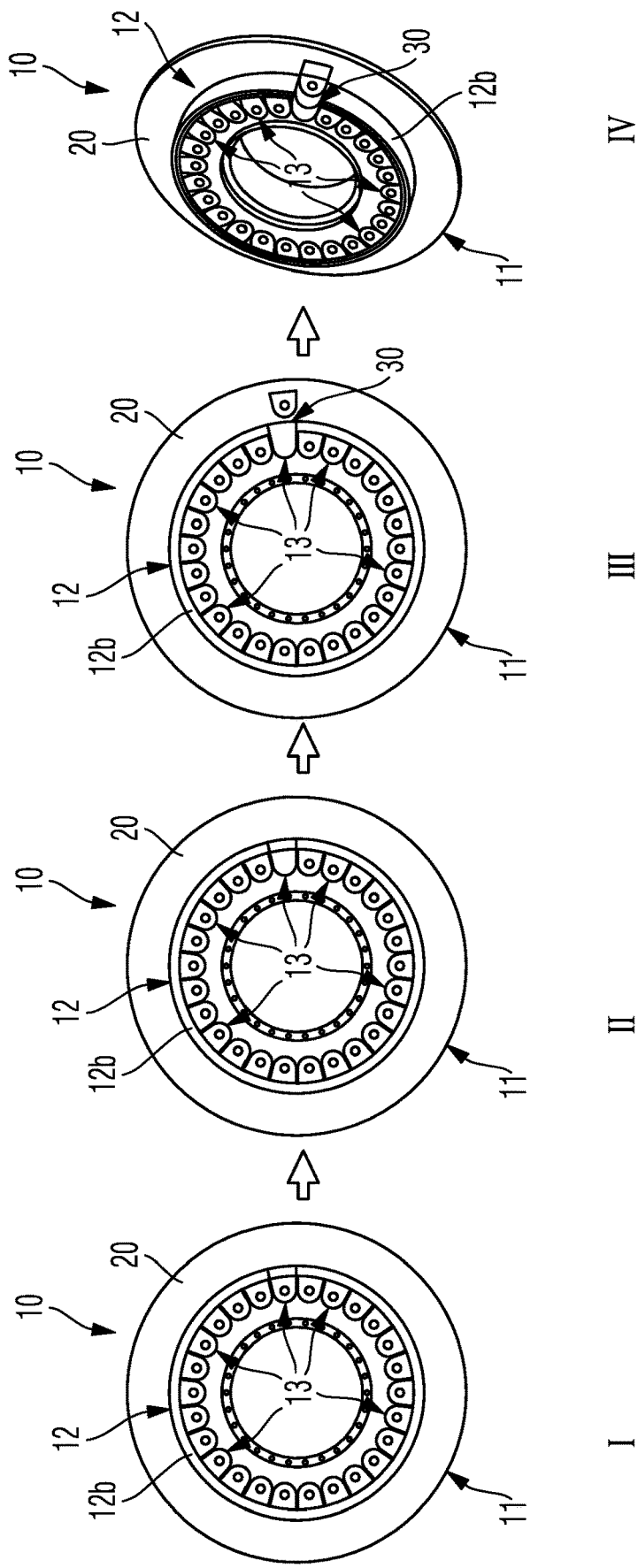
FIG. 6 shows multiple lateral views of the bearing assembly for the further illustration of the access to individual segments of the bearing assembly.

FIG. 6 shows details relating to the access to individual rotor-side axial slide bearing segments 13 of the bearing assembly 10. In the housing 12, namely the section 12b of the housing 12, a mounting opening 30 is introduced, via which an individual rotor-side axial sliding segment 16, following the disconnection of the fastening screws 15 that are visible in FIG. 3, can be removed from the respective receiving pocket 24, namely in the radial direction. By turning the rotor 11, the mounting opening 30 can be superposed on the respective rotor-side axial sliding segment 13 to be disassembled. Following the disassembly of the rotor-side axial slide bearing segment 13 that may be defective, the same can be replaced with a new rotor-side axial bearing segment 13, namely again in the radial direction via the threading opening 30.

The bearing assembly 10 for the rotor 11 of a wind turbine according to an aspect of the invention can be easily produced, mounted and demounted. Individual slide bearing segments can be individually accessed so that in the event of a failure of the bearing assembly 10 it is not necessary to completely disassemble the drive train or completely disassemble the wind turbine. The slide bearing segments 13, 15 and 21 are partly supported by the housing 12 and partly by the rotor 11. The same can be individually mounted and demounted.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

LIST OF REFERENCE NUMBERS

10 Bearing assembly
11 Rotor
12 Housing
12a Housing section
12b Housing section
13 Rotor-side axial slide bearing segment
13a Holder
13b Sliding body
13c Fastening screw
13d Cover
13e Disc spring
14 Sliding surface
15 Stator-side axial slide bearing segment
16 Sliding surface
17 Projection/thrust collar
18 Shaft
19 Hub
20 Rotor blade
21 Stator-side radial slide bearing segment
22 Sliding surface
23 Projection
24 Receiving space
25 Fastening screw
26 Segment holder
27 Segment
28 Bearing load
29 Reaction force
30 Mounting opening

The invention claimed is:

1. A bearing assembly (10) of a rotor (11) of a wind turbine, for mounting the rotor (11) in a fixed housing (12), comprising:
   a plurality of rotor-side axial slide bearing segments (13), each configured to:
      engage on the rotor (11), rotate together with the rotor (11), and
      be supported against a sliding surface (14) of the housing (12);

a plurality of housing-side axial slide bearing segments (15), each axially adjacent to a respective one of the rotor-side axial slide bearing segments (13) and configured to:
    engage on the housing (12), be fixed together with the housing (12), and
    be supported against a first sliding surface (16) of the rotor (11); and
a plurality of housing-side radial slide bearing segments (21), each arranged radially inside the plurality of housing-side axial slide bearing segments (15) and the plurality of rotor-side axial slide bearing segments (13) and configured to:
    engage on the housing (12), be fixed together with the housing (12), and
    be supported against a second sliding surface (22) of the rotor (11),
wherein the sliding surface (14) of the housing (12) is parallel to the first sliding surface (16) of the rotor (11), and
wherein the second sliding surface (22) of the rotor (11) is perpendicular to the first sliding surface (16) of the rotor (11).

2. The bearing assembly according to claim 1, further comprising a radial projection (17) of the rotor (11) configured as a rotor-side thrust collar secured to a hub or shaft (18) of the rotor (11), wherein the rotor-side axial slide bearing segments (13) are fastened to the radial projection (17).

3. The bearing assembly according to claim 1, wherein with respect to a hub of the rotor:
the plurality of rotor-side axial slide bearing segments (13) are arranged axially closest to the hub of the rotor,
the plurality of housing-side radial slide bearing segments (21) are arranged axially furthest from the a hub of the rotor, and
the plurality of housing-side axial slide bearing segments (15) are arranged axially between the plurality of rotor-side axial slide bearing segments (13) and the plurality of housing-side radial slide bearing segments (21).

4. A bearing assembly of a rotor (11) of a wind turbine, for mounting the rotor (11) in a fixed housing (12), comprising:
a plurality of rotor-side axial slide bearing segments (13), each configured to: engage on the rotor (11), rotate together with the rotor (11), and be supported against a sliding surface (14) of the housing (12);
a plurality of housing-side axial slide bearing segments (15), each configured to: engage on the housing (12), be fixed together with the housing (12), and be supported against a first sliding surface (16) of the rotor (11);
a plurality of housing-side radial slide bearing segments (21), each configured to: engage on the housing (12), be fixed together with the housing (12) and be supported against a second sliding surface (22) of the rotor (11),
a radial projection (17) of the rotor (11) configured as a rotor-side thrust collar secured to a hub or shaft (18) of the rotor (11), wherein the rotor-side axial slide bearing segments (13) are fastened to the radial projection (17); and
axial projections (23) on the radial projection (17) of the rotor (11), the axial projections (23) together with the radial projection (17) defining receiving pockets (24) for the rotor-side axial slide bearing segments (13).

5. The bearing assembly according to claim 4, wherein the housing-side axial slide bearing segments (15) are supported against the first sliding surface (16) of the rotor (11) provided by the rotor-side thrust collar (17).

6. The bearing assembly according to claim 5, wherein the housing-side radial slide bearing segments (15) are supported against the second sliding surface (22) of the rotor (11) provided by the hub or shaft of the rotor (11).

7. The bearing assembly according to claim 6, further comprising a housing-side segment holder (26) configured to receive both the housing-side axial slide bearing segments (15) and the housing-side radial slide bearing segments (21), wherein the segment holder (26) is detachably fastened to the housing (11).

8. The bearing assembly according to claim 7, wherein the segment holder (26) is segmented into a plurality of segments (27), wherein each segment (27) of the segment holder (26) receives at least one housing-side axial slide bearing segment (15) and at least one housing-side radial slide bearing segment (21).

9. The bearing assembly according to claim 8, wherein a number of the housing-side axial slide bearing segments (15) received on the respective segment (27) of the segment holder (26) corresponds to a number of the housing-side radial slide bearing segments (21) received on the respective segment (27) of the segment holder (26).

10. The bearing assembly according to claim 9, wherein each segment (27) of the segment holder (27) receives a single housing-side axial slide bearing segment (15) and a single housing-side radial slide bearing segment (21).

11. The bearing assembly according to claim 8, wherein the number of the housing-side axial slide bearing segments (15) received on the respective segment (27) of the segment holder (26) deviates from the number of the housing-side radial slide bearing segments (21) received on the respective segment (27) of the segment holder (26).

12. The bearing assembly according to claim 11,
wherein, the housing-side axial slide bearing segment (15) to be removed is mounted on the respective segment (27) of the segment holder (26), and is initially demountable from the respective segment (27) of the segment holder (26), and
wherein the respective segment (27) of the segment holder (26) is demountable from the housing (12) and removable together with the housing-side axial slide bearing segment (15).

13. The bearing assembly according to claim 12, wherein a threading opening (30) is formed on the housing (12) for the rotor-side axial slide bearing segments (13) such that the rotor-side axial slide bearing segments (13) are mountable and demountable.

* * * * *